Patented Oct. 12, 1937

2,095,546

UNITED STATES PATENT OFFICE 2,095,546

TREATMENT OF CHEMICAL PULP

Frederick F. Frick, Anaconda, Mont., assignor to International Smelting and Refining Company, East Chicago, Ind., a corporation of Montana No Drawing. Application October 2, 1935, Serial No. 43,197

11 Claims. (Cl. 210—1)

This invention relates to the separation of solid matter from liquids by decantation, sedimentation, settlement, or the like, and has for an object the provision of an improved method for increasing the rate at which suspended matter settles from a chemical or metallurgical pulp or other suspension.

In any process involving the separation of solids from a liquid by decantation, sedimentation, settlement, or the like, a mixture of solid and liquid is introduced into a suitable container and is allowed to remain therein for a sufficient period of time to permit the relatively heavy solid particles to settle to the lower portion of the container. The supernatant liquid is then withdrawn from the upper portion of the container. The operation may be conducted in a continuous manner by continuously introducing the suspension into the container and continuously and separately withdrawing the suspended matter and the supernatant liquid, or batches of the liquid-solid mixture may be treated individually. In either case the speed and efficiency with which the separation is effected depends upon the rate at which the solid particles settle in the liquid medium in which they are suspended. Any method which will increase the rate at which settlement occurs will in general improve both the speed and efficiency of the operation.

The rate at which a particle in suspension in a liquid settles depends upon the viscosity of the liquid and upon the mass of the particle. The lower the viscosity of the liquid, or the greater the mass of the particle, the greater will be the speed with which settlement from free suspension occurs. Heating generally decreases the viscosity of a liquid, but when dealing with suspensions of solid particles in the most common liquids, such as water or water solutions generally, viscosity is a relatively unimportant factor in the rate of settlement of the suspended particles. In some instances, heating the suspension causes the suspended particles to coagulate or coalesce into larger particles of increased mass, and, when this occurs, the rate and efficiency of the settlement will be markedly increased.

It frequently happens, however, that mere heating does not bring about coagulation or coalescence of the suspended particles to a sufficient extent to appreciably affect the rate at which settlement occurs, and, in any case, heating large volumes of suspension is an expensive procedure which is best avoided whenever practicable.

In accordance with the present invention, an improved method is provided for increasing the rate of settlement of suspended matter from chemical or metallurgical pulps, thereby to increase the speed and efficiency of decantation or similar operations. The term "pulp" as employed herein refers to a mixture of solid and liquid matter. The solid component of the pulp may comprise one or more chemical substances and may range in particle size from extremely fine to rather coarse. The liquid component, generally aqueous, may consist of a relatively pure liquid, or it may comprise a solution of two or more liquids or a solution of a normally solid substance in a liquid, for example, an aqueous salt solution.

In carrying out a method of the invention, an emulsion of a starch-bearing material is prepared and incorporated in the pulp prior to carrying out the separation of the solid and liquid components of the pulp. Apparently, the starch, upon being incorporated in the pulp, causes the particles of solid matter to coagulate or coalesce into relatively coarse particles, materially increasing the mass of each particle and thus increasing the rate at which they will settle in the liquid. Whatever the reason may be, however, incorporation of the starch in the pulp does have the effect of increasing the rate of settlement of the solid matter and thus permits a more rapid and efficient separation of solid and liquid.

Any suitable starch-bearing material may be employed in preparing the emulsion. Starch itself may be used, or starch-bearing grains or vegetables may in some cases prove effective. Grain flour, however, has been found to be a particularly satisfactory starch-bearing material, and its use generally is preferred. Particular reference will therefore be made to starch-bearing emulsions prepared from flour. For purposes of economy in practicing the invention, relatively low-grade flour products such, for example, as foundry flour may be employed advantageously.

In general, an aqueous emulsion of the starch-bearing material is preferred. Such an emulsion may be prepared by mixing the starch-bearing material, for example, flour, and water in suitable proportions, say one pound of flour to ten gallons of water, and heating the mixture, preferably to the boiling point, for about five to ten minutes. The heating may be accomplished by heating the container in which the water-flour mixture is prepared, or live steam may be introduced directly into the mixture. The resulting emulsion, referred to as a "cooked" emulsion, preferably is added to the pulp prior to decantation or other similar operation and is incorporated therein by agitation.

As a specific example of the method of the present invention, its use in conjunction with the process described and claimed in the copending application of Frederick F. Frick and Jehu P. Cooper, Serial Number 751,448, filed November 5, 1934, is described below. In the process of that application, slime products containing tin, lead, antimony, and the like, obtained during the processing of secondary metals for the recovery of metal values, are treated for separation of their lead content, which is in the form of lead sulphate. The slime is first treated with a water solution of an alkali metal carbonate, which converts the lead to lead carbonate. The insoluble lead carbonate, together with insoluble tin-bearing material, is separated from the resulting alkali metal sulphate solution by decantation, and the residue is washed by repeated agitation with water, followed by further decantation.

The washed residue of lead carbonate and tin-bearing material is treated with nitric acid to dissolve the lead carbonate, leaving the tin compounds substantially unaffected. Separation of the tin, which may be in the form of tin oxide or tin hydrate, from the lead nitrate solution is effected by decantation; it is then washed repeatedly with water and the washings are again decanted.

Each of the decantation operations involved in the above process may be carried out more quickly and more efficiently by proceeding in accordance with the present invention. In each case, an aqueous emulsion containing a starch-bearing material, for example, flour, is prepared substantially as described above and is added to the pulp. The pulp is agitated to thoroughly incorporate the emulsion therein, and it is then allowed to settle, after which the supernatant liquid is decanted. Settlement of the solid matter, whether it be the lead carbonate or the tin oxide, proceeds rapidly and effectively, so that a quick and efficient separation of the solids from the bulk of the liquid is readily achieved.

Only a very small quantity of the emulsion of the starch-bearing material need be employed in proceeding according to the invention. For example, in separating lead carbonate or tin oxide from aqueous suspension in accordance with the above example, only that amount of emulsion corresponding to about four pounds of flour per twenty-five tons of pulp being treated was required to accomplish quick and thorough settlement of the suspended material. In the treatment of pulps containing other solids than those of the example, more or less than this amount of the emulsion may be required to secure the best results.

I claim:

1. In decanting an aqueous chemical or metallurgical pulp, the improvement which comprises preparing a cooked aqueous emulsion with a starch-bearing material by heating a mixture of water and starch-bearing material substantially to the boiling point, adding an effective amount of the resulting cooked emulsion to the pulp, and agitating the pulp to incorporate the cooked emulsion therein, thereby to increase the rate of settlement of the suspended matter in the pulp.

2. In decanting an aqueous chemical or metallurgical pulp, the improvement which comprises preparing a cooked aqueous emulsion with flour by heating a mixture of water and flour substantially to the boiling point, adding the cooked emulsion to the pulp, and agitating the pulp to incorporate the cooked emulsion therein, thereby to increase the rate of settlement of the suspended matter in the pulp.

3. The method of increasing the rate of settlement of suspended matter in a chemical or metallurgical pulp which comprises incorporating in the pulp an effective amount of a cooked emulsion comprising a starch-bearing material, said emulsion being prepared by heating a mixture of starch-bearing material and a suitable liquid to a temperature sufficiently high to effect emulsification of the starch-bearing material.

4. The method of increasing the rate of settlement of suspended matter in a chemical or metallurgical pulp which comprises preparing a cooked aqueous emulsion comprising a starch-bearing material by heating a mixture of starch-bearing material and water substantially to the boiling point, and incorporating an effective amount of said cooked emulsion in the pulp.

5. The method of increasing the rate of settlement of suspended matter in a chemical or metallurgical pulp which comprises preparing a cooked aqueous emulsion comprising flour by heating a mixture of flour and water substantially to the boiling point, and incorporating an effective amount of said cooked emulsion in the pulp.

6. The method of increasing the rate of settlement of lead carbonate in an aqueous pulp containing lead carbonate in suspension which comprises preparing a cooked aqueous emulsion comprising flour by heating a mixture of flour and water substantially to the boiling point, and incorporating an effective amount of said cooked emulsion in the pulp.

7. The method of increasing the rate of settlement of water-insoluble tin-bearing compounds from an aqueous pulp containing such tin compounds in suspension which comprises preparing a cooked aqueous emulsion comprising flour by heating a mixture of flour and water substantially to the boiling point, and incorporating an effective amount of said cooked emulsion in the pulp.

8. In the processing of secondary metals involving the production of an aqueous pulp containing a suspended tin compound and the decantation of said pulp, the improvement which comprises preparing a cooked aqueous emulsion comprising a starch-bearing material by heating a mixture of water and starch-bearing material substantially to the boiling point, adding said emulsion in an effective amount to the pulp prior to the decantation thereof, and agitating the pulp to incorporate the emulsion therein, thereby to increase the rate of settlement of the tin compound.

9. The method of increasing the rate of settlement of suspended matter in a chemical or metallurgical pulp which comprises preparing a cooked aqueous emulsion containing flour by heating a mixture of flour and water substantially to the boiling point, and incorporating said emulsion in the pulp in an amount equivalent to about four pounds of flour per twenty-five tons of pulp.

10. The method of increasing the rate of settlement of suspended matter in a chemical or metallurgical pulp which comprises preparing a cooked aqueous emulsion containing flour by heating substantially to the boiling point a mixture of flour and water in the proportions of about one pound of flour per ten gallons of water, and incorporating an effective amount of said cooked emulsion in the pulp.

11. The method of increasing the rate of settlement of suspended matter in a chemical or metallurgical pulp which comprises preparing a cooked aqueous emulsion containing flour by heating substantially to the boiling point a mixture of flour and water in the proportions of about one pound of flour per ten gallons of water, and incorporating said cooked emulsion in the pulp in an amount equivalent to about four pounds of flour per twenty-five tons of pulp.

FREDERICK F. FRICK.